(12) United States Patent
Orava et al.

(10) Patent No.: US 7,720,029 B2
(45) Date of Patent: May 18, 2010

(54) CHANNEL SELECTION IN WIRELESS TELECOMMUNICATION SYSTEM

(75) Inventors: Pekko Orava, Tampere (FI); Jarkko Posti, Kämmenniemi (FI)

(73) Assignee: Nokia Corporation, Espoo (FI)

( * ) Notice: Subject to any disclaimer, the term of this patent is extended or adjusted under 35 U.S.C. 154(b) by 1063 days.

(21) Appl. No.: 10/793,191

(22) Filed: Mar. 4, 2004

(65) Prior Publication Data

US 2004/0218562 A1    Nov. 4, 2004

(30) Foreign Application Priority Data

Mar. 7, 2003   (FI) .................................. 20030349

(51) Int. Cl.
H04W 4/00    (2009.01)

(52) U.S. Cl. .................. 370/329; 370/328; 370/338; 370/341; 455/41.2; 455/41.3; 455/63.1; 455/67.13; 455/550.1; 455/552.1; 455/553.1

(58) Field of Classification Search ................. 370/328, 370/329, 338, 341; 455/41.2, 41.3, 63.1, 455/67.13, 550.1, 552.1, 553.1
See application file for complete search history.

(56) References Cited

U.S. PATENT DOCUMENTS

| | | | |
|---|---|---|---|
| 6,400,963 B1 * | 6/2002 | Glockler et al. ........... 455/553.1 |
| 6,621,454 B1 * | 9/2003 | Reudink et al. ............. 342/367 |
| 6,704,346 B1 * | 3/2004 | Mansfield .................... 375/136 |
| 6,801,777 B2 * | 10/2004 | Rusch ...................... 455/452.2 |
| 6,961,019 B1 * | 11/2005 | McConnell et al. ........ 342/357.1 |
| 6,999,723 B2 * | 2/2006 | Kusbel et al. ............... 455/63.1 |
| 2002/0032039 A1 * | 3/2002 | Kimata ....................... 455/556 |
| 2002/0176385 A1 | 11/2002 | Huh et al. |
| 2002/0177414 A1 * | 11/2002 | Shimada et al. ............ 455/67.1 |
| 2003/0058830 A1 * | 3/2003 | Schmidt ...................... 370/347 |
| 2003/0060206 A1 * | 3/2003 | Sointula et al. ............. 455/450 |

FOREIGN PATENT DOCUMENTS

| EP | 1 261 225 A2 | 11/2002 |
|---|---|---|
| EP | 1413979 A1 | 4/2004 |
| WO | WO 03/024129 A1 | 3/2003 |

\* cited by examiner

*Primary Examiner*—Stephen M D'Agosta
(74) *Attorney, Agent, or Firm*—Hollingsworth & Funk, LLC (57) ABSTRACT

Channel selection in a wireless telecommunication system includes determining at least one transmission frequency used by a first transceiver from information on the first transceiver. The harmonics of the transmission frequency are determined and at least one channel used by the second transceiver is selected by at least taking into account the harmonics of the transmission frequency of the first transceiver.

20 Claims, 7 Drawing Sheets

CHANNEL SELECTION IN WIRELESS TELECOMMUNICATION SYSTEM

FIELD OF THE INVENTION

The invention relates to channel selection in a telecommunication system and particularly to channel selection in terminals capable of operating simultaneously at least at two different operational frequencies.

BACKGROUND OF THE INVENTION

In wireless telecommunication, harmonics form on multiples of the base frequency. Harmonics are multiples of the base frequency and caused by the non-linear properties of the transmitter. If a harmonic is in the pass band of a nearby receiver and is sufficiently strong, the harmonic may weaken the performance of the receiver. If a sufficiently strong interfering signal not on the actual pass band of the receiver is directed to the receiver, the operation of the receiver may still be disturbed because of its non-linearity. As the number of wireless users increases and, on the other hand, as new transmission technologies are developed, many new frequency ranges are taken into use. Multiples of other frequency bands avoidably coincide with the frequency bands, i.e. harmonics may cause problems in the operation of the receivers. Multiples coincide particularly with non-licensed frequencies of over 5 GHz. Multiples of for instance DCS1800 (1710-1785 MHz), PCS1900 (1850-1910 MHz) and GSM900 (880-915 MHz) coincide with the 5-GHz band, for which different wireless local area network techniques have been developed. The IEEE 802.11a standard specifies one technology operating in this frequency range.

The problem caused by harmonics is emphasized when multimode terminals are developed that include a transceiver whose transmitter causes harmonics in the frequency range of another receiver or transceiver. Since the transmitter of the first transceiver and the receiver of the second transceiver are physically close, harmonics may cause strong interference in the operation of the receiver of the second transceiver.

A solution has been developed for terminals comprising a transceiver according to the GSM 850 technique (in the transmission frequency range 824 to 849 MHz) and a Bluetooth transceiver operating in a 2.4-GHz non-licensed frequency range, wherein the Bluetooth module uses radio measurements to specify radio transmissions in its environment, such as frequencies used by a GSM transmitter comprised by a terminal. The measurements are used to modify the hop set used in the Bluetooth module so as to avoid frequency ranges causing interference. This allows also the avoidance of sufficiently strong harmonics in the GSM transmitter. The drawback of this solution is the need for radio measurements and related equipment for avoiding harmonics. Many radio techniques also exist that do not use frequency hopping and, consequently, wherein frequency hopping settings cannot be changed to avoid harmonics.

BRIEF DESCRIPTION OF THE INVENTION

The object of the invention is thus to provide a method and equipment for implementing the method so as to avoid the problems of the above solution. The object of the invention is achieved by a method, a transceiver unit and a wireless terminal that are characterized in what is stated in the independent claims. Preferred embodiments of the invention are described in the dependent claims.

The invention is based on determining at least one transmission frequency used by the first transceiver means from information on the first transceiver means. At least one transmission frequency harmonic is specified and at least one channel is selected for use in the second transceiver means by at least taking into account the specified transmission frequency harmonics of the first transceiver means. A channel always has a given frequency range, based on which the aim is to select the channel in such a manner that the frequency range does not include harmonics of the first transceiver means. Depending on the radio technique used, the same frequency range may naturally have several available channels (e.g. code division multiple access technology; CDMA) and/or channels may also be specified by time division. Consequently, several channels may exist in the harmonics frequency range and, on the other hand, several channels outside the harmonics frequency range may remain to be selected. Typically, frequency ranges are divided base station-specifically or access point-specifically, and therefore a base station and base station channels to which harmonics are directed are avoided.

An advantage of the arrangement of the invention is that the interference caused by the harmonics caused by the transmitter comprised by the terminal in the receiver comprised by the terminal can be avoided or at least their effect can be reduced. Another advantage is that transmitter harmonics can be taken into account without radio measurements. Once the transmitter transmission frequency and the harmonic caused thereby are specified, harmonics can be taken into account before the channel is taken into use, whereby harmonics cause as little interference as possible in communication.

In accordance with a preferred embodiment of the invention, the selection of channels wherein harmonics reside is prevented. This provides a simple way to set such channels as barred channels that are not used in channel activation or channel change. In accordance with another embodiment of the invention, the channels wherein harmonics do not reside are preferred. This may be implemented for instance on the basis of the distances of the proposed channels and the harmonics; the strength of the proposed channel may also be taken into account. This embodiment provides the advantage that a channel close to a harmonic can also be avoided. On the other hand, a channel on a harmonic may also be used if it is sufficiently good in other respects.

BRIEF DESCRIPTION OF THE FIGURES

In the following, preferred embodiments of the invention will be described in detail with reference to the accompanying drawings, in which.

DETAILED DESCRIPTION OF THE INVENTION

Figure 1:
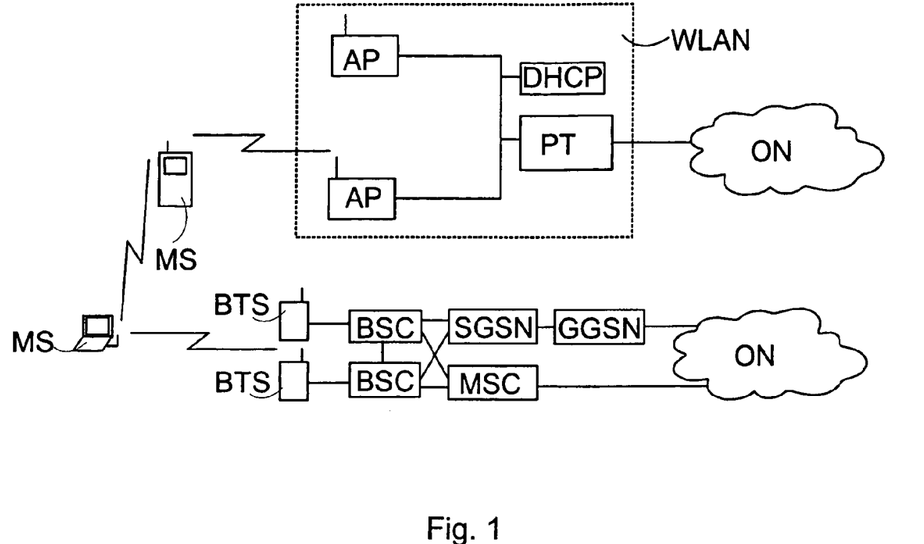
FIG. 1 illustrates a telecommunication system comprising a cellular network and a wireless local area network.

FIG. 1 shows a telecommunication system comprising a cellular network and a wireless local area network. The example in FIG. 1 is a wireless local area network WLAN and a mobile network according to the GSM/GPRS system (General Packet Radio Service), wherein at least the DCS 1800 frequency range can be used (uplink 1710-1785 MHz). The DCS 1800 frequency range causes harmonics in the range 5130-5355 MHz, i.e. in the frequency range 5150-5350 MHz generally allocated to the WLAN system. However, the solution of the invention is usable in any wireless networks in mobile stations capable of communication.

The wireless local area network WLAN comprises access devices called access points AP that offer radio access to a mobile station MS and thus terminate the broadband radio link. The access point AP manages the radio interface in accordance with the radio technology used, in accordance with the IEEE 802.11 standard in one preferred embodiment. A wireless network connection can also be set up directly between two mobile stations MS comprising a WLAN transceiver (Ad-hoc). The IEEE 802.11 specifications specify the protocols of both the physical layer and the MAC layer for data transfer over the radio interface. The AP also attends to the bridging or routing of radio interface data streams to and from other network nodes. The WLAN network may also provide a gateway interface to other networks ON, such as the Internet, via a device called a portal PT. Typically, the WLAN network also comprises other servers, such as a DHCP server (Dynamic Host Configuration Protocol) that allocates IP addresses to mobile stations MS.

In accordance with the IEEE 802.11 standard, so-called CSMA/CA technique (Carrier Sense Multiple Access with Collision Avoidance) is used in the MAC layer. In radio-frequency data transfer, DSSS (Direct Sequence Spread Spectrum) or FHSS (Frequency Hopped Spread Spectrum) can be used. In the IEEE 802.11 technique, center frequencies are at 20-MHz distances from each other. In all systems according to the IEEE 802.11 standards, transmission and reception occur alternately in the same frequency band, i.e. a half-duplex technique is concerned. The IEEE 802.11a standard using the OFDM technique (Orthogonal Frequency Division Multiplex) has been developed for the 5-GHz frequency range. In the OFDM technique according to the IEEE 802.11a standard, one radio channel is divided into several subcarriers that are all associated with the same transmission. The invention is also applicable to other devices using WLAN techniques already standardized or being developed, such as devices using e.g. the HiperLAN or Bluetooth communication techniques.

In a mobile communication network, a mobile services switching centre MSC is able to provide a mobile station MS with circuit-switched services. A core network providing packet-switched services comprises a Serving GPRS Support Node (SGSN) serving mobile stations MS connected to a base station subsystem, and a Gateway GPRS Support Node (GGSN) providing a gateway function to external networks, such as the Internet or a company's intranet. The system may also comprise other known network elements, not shown in FIG. 1, such as a short message service centre and elements of a billing system.

Both the SGSN and the MSC/VLR utilize the same Base Station System (BBS). The BSS comprises Base Transceiver Stations (BTS) communicating with the mobile stations MS over a radio path and Base Station Controllers (BSC) for controlling the radio frequencies and radio channels available to the base transceiver stations BTS connected to them. A base transceiver station BTS always comprises at least one transceiver that implements one carrier, i.e. eight timeslots, i.e. eight physical channels. One base transceiver station BTS typically serves one cell, but a solution is feasible wherein one base transceiver station BTS serves several sectored cells. The tasks of a base transceiver station BTS include for instance: calculation of TA (timing advance), uplink measurements, channel coding, encryption, decryption and frequency hopping.

Figure 2:
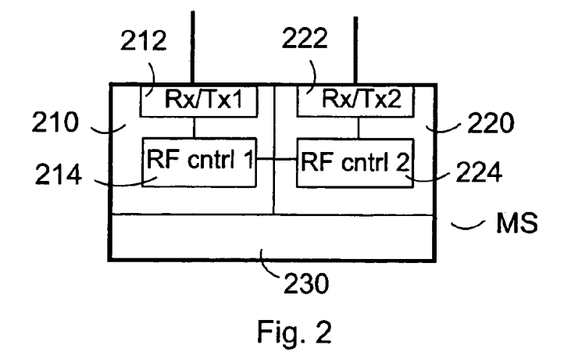
FIG. 2 illustrates a mobile station according to a preferred embodiment of the invention.

FIG. 2 illustrates the functions associated with the invention of a mobile station MS according to a preferred embodiment of the invention. The MS is a multimode mobile station, more exactly a dual mode mobile station. The MS comprises a functionality 210 for connecting to a first wireless network and a functionality 220 for connecting to a second wireless network. The functionalities 210 and 220 comprise at least a first transceiver 212 and control means 214 for controlling it, and, respectively, a second transceiver 222 and control means 224 for controlling it. The mobile station MS naturally also comprises generally well-known common functions and parts, which are denoted by reference 230 in FIG. 2. The MS comprises memory, a user interface, and a Central Processing Unit (CPU) comprising one or more processors. Computer program codes executed in the central processing unit are used for causing the MS to implement the inventive functions, some embodiments of which are illustrated later in association with FIGS. 3 to 8a, 8b and 11. Hardware solutions or a combination of hardware and software solutions may also be used to implement the inventive functions.

The components of the transceivers 212 and 222 are typically implemented with ASIC circuits (Application Specific Integrated Circuit). The transceiver 212, 222 comprises a transmitter, a receiver, a synthesizer and a local oscillator for enabling frequency conversion, and a switch for selecting transmission or reception. The components of a transmitter or a receiver are not described in more detail since they are known to a person skilled in the art. The control means 214 and 224 similarly serve to control the switch of the transceiver 212 and 222 for selecting transmission/reception (RX/TX Select), transmitter power, receiver amplification, for selecting the frequencies provided by the synthesizer and for setting channels. The MS may be for instance an integrated communication device, a laptop computer, connected to equipment providing radio access (e.g. a WLAN card), or a combination of a PDA device and a mobile phone.

In accordance with a preferred embodiment, the harmonics of the transmit frequencies of the first transceiver means 212, 214 communicating with a GSM network are avoided in the second transceiver means 222, 224 providing WLAN connections. Herein, at least part of the harmonics caused by the uplink channels of the first transceiver means 212, 214 can be specified. The aim is to specify particularly the harmonics that harmfully coincide with the frequency range of the WLAN connections. Harmonics can then be avoided in the control means 224 when selecting one or more frequencies to be used for the WLAN connection.

Figure 3:
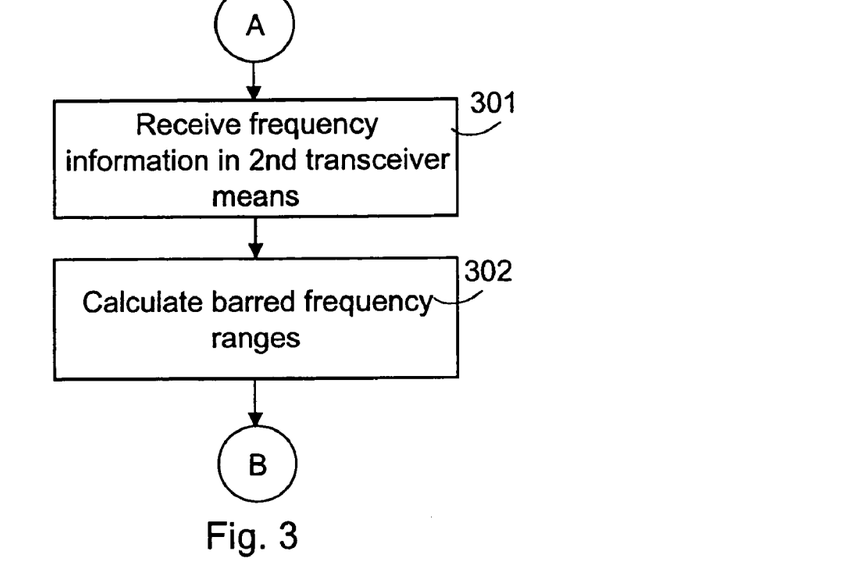
FIG. 3 shows a flow diagram illustrating a method according to a preferred embodiment of the invention.

FIG. 3 illustrates a method according to a preferred embodiment of the invention, in accordance with which the second transceiver means 222, 224 receive 301 information about one or more transmit frequencies used by the first transceiver means 212, 214. This frequency information is used to calculate the harmonics of the transmit frequencies (as multiples of the frequency information). This way at least one barred frequency range is obtained, which should not be used in the second transceiver means 222, 224 at least as the downlink frequency. The barred frequency ranges can be used to affect the frequency used in the second transceiver means 222, 224, as will be illustrated later in the embodiments of FIGS. 6 and 7.

Figure 4:
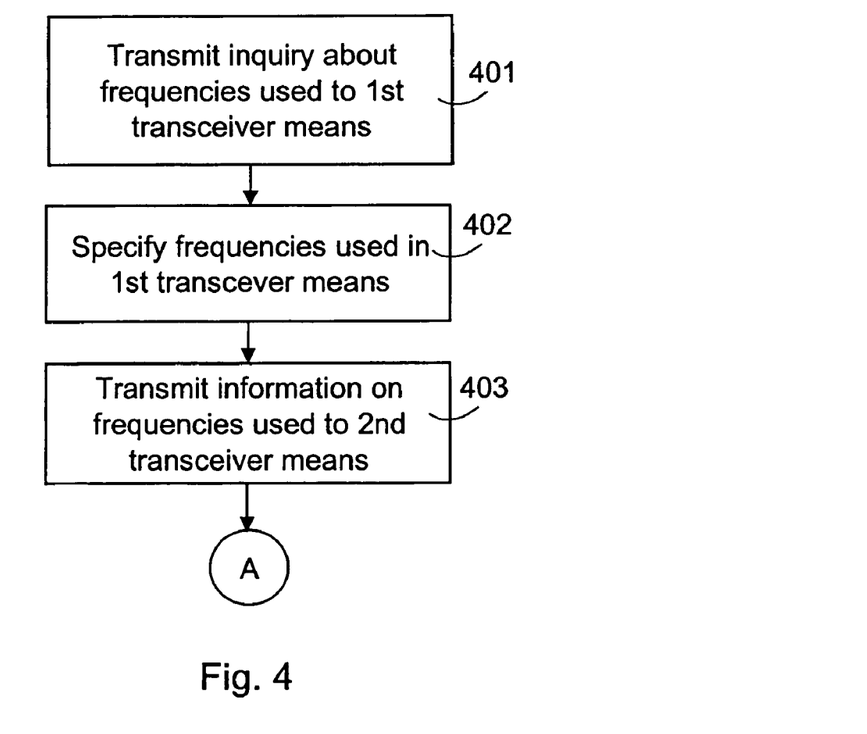
FIG. 4 shows a flow diagram illustrating a method according to a preferred embodiment of the invention.

FIG. 4 illustrates a preferred embodiment, which may precede the steps illustrated in FIG. 3. An inquiry about the frequencies used is submitted 401 from the second transceiver means 222, 224 to the first transceiver means 212, 214. This inquiry may be submitted for instance when the mobile station MS, its WLAN functionality 220 or its data transfer service is activated, when there is need to change access points AP, or when it is detected that the current connection is poor in accordance with one or more predetermined quality criteria. The frequencies to be used in the transmission are determined 402 from the information of the first transceiver means 212, 214. The frequency information is obtained for instance from transmitter settings maintained by the control means 214, and no radio measurements are needed. The frequency information is sent 403 to the second transceiver means 222, 224.

Figure 5:
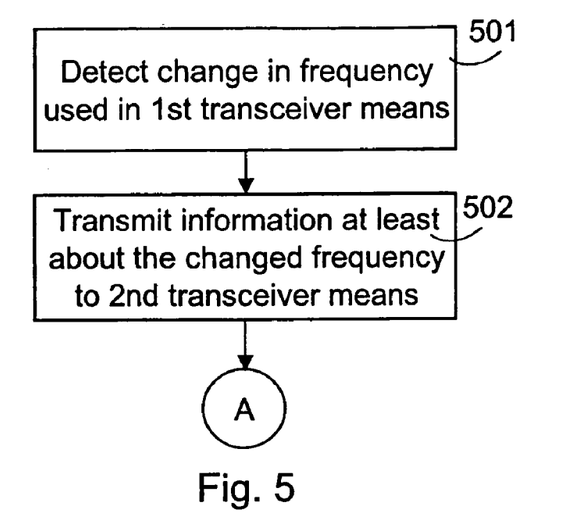
FIG. 5 shows a flow diagram illustrating a method according to a preferred embodiment of the invention.

FIG. 5 illustrates another embodiment, which may precede the steps illustrated in FIG. 3. When a change is detected 501 in the first transceiver means 212, 214 in at least one frequency used for transmission, information about at least the changed frequency is sent to the second transceiver means 222, 224. Information about the transmit frequencies used can also be sent because of a change in transmit power. The advantage of this embodiment is the immediate ability to send information, once a change has taken place, about a change in frequency to the second transceiver means 222, 224 without a separate inquiry request. It is also possible to apply both methods illustrated in FIGS. 4 and 5 to the mobile station MS.

Figure 6:
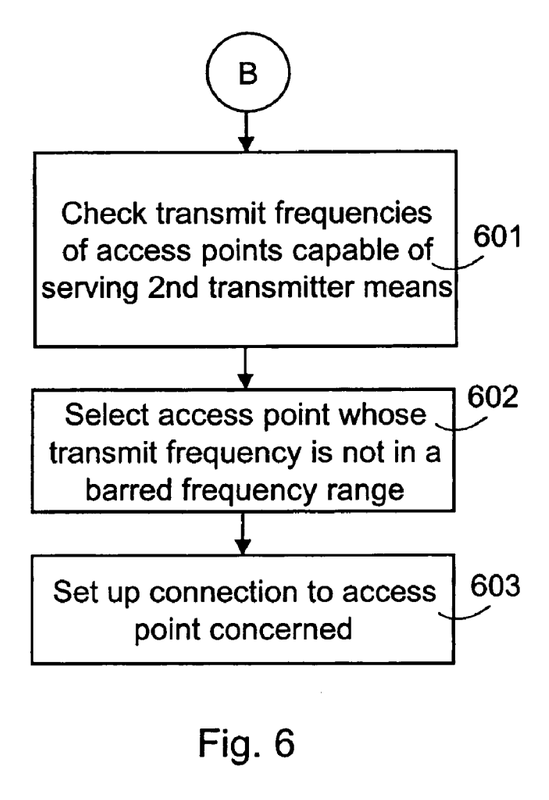
FIG. 6 shows a flow diagram illustrating a method according to a preferred embodiment of the invention.

FIG. 6 illustrates a preferred embodiment that can be utilized after the steps illustrated in FIG. 3. Once at least one barred frequency range is known, the transmit frequencies of the access points AP capable of serving the second transceiver means 222, 224 are checked 601. This information is obtained in the control unit 224 by active scanning, wherein Probe Requests are transmitted to the access points AP, the access points AP replying to them by Probe Response messages carrying the corresponding access point information. Another alternative is to use passive scanning, wherein the information on the access points AP is obtained from received Beacon messages. In step 602, an access point AP is selected whose transmission frequency is not in a barred frequency range, and in step 603, a connection is set up to the selected access point. In step 602, when the access point AP is being selected, other necessary criteria may naturally be taken into account, e.g. the strength of the received signal. The barred frequency range may thus constitute one new excluding criterion in the access point selection algorithm. In accordance with an embodiment, access points AP transmitting at frequencies of the harmonics may be entirely pre-eliminated in the selection algorithm from the available access points.

Figure 7:
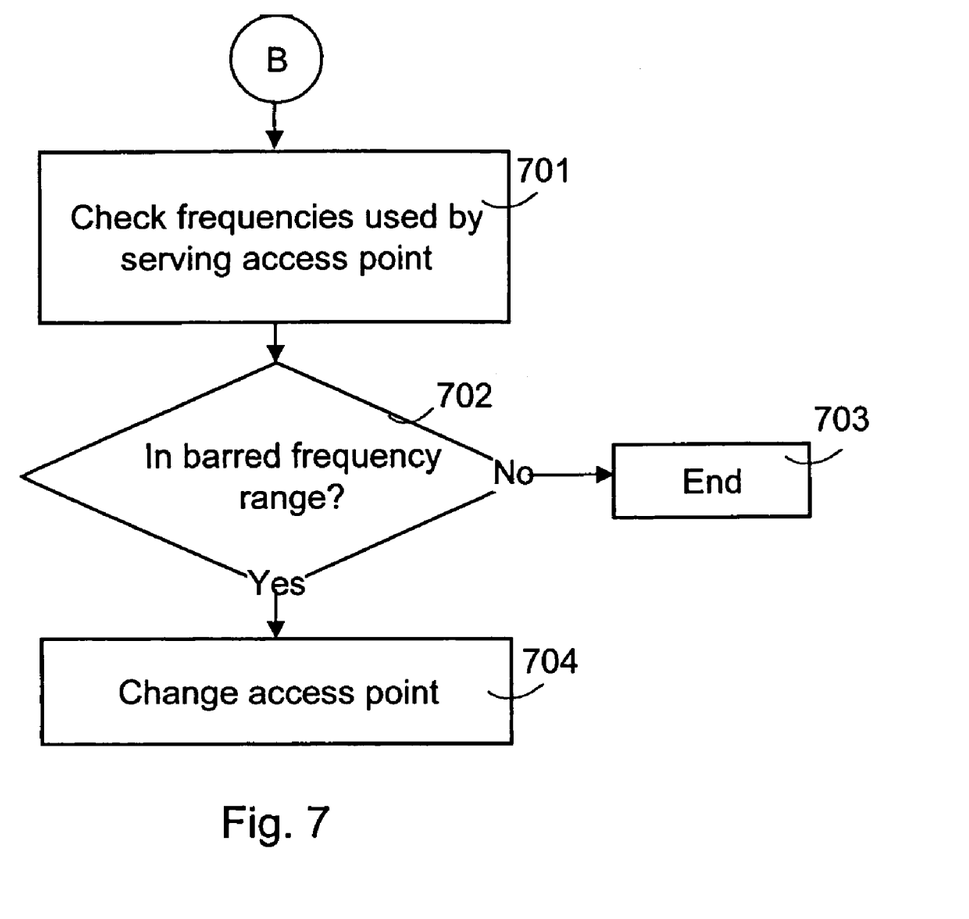
FIG. 7 shows a flow diagram illustrating a method according to a preferred embodiment of the invention.

If an access point AP is already serving the second transceiver means 222, 224, then the method illustrated in FIG. 7 can be applied after step 302 of FIG. 3. When at least one barred frequency range is known, the transmission frequency of the access point AP serving the second transceiver means 222, 224 is checked 701. This information is obtained from the reception frequency of the transceiver 222, known to the control means 224. In step 702, a check is made to see if a transmission frequency is in a barred frequency range. If not, no changes are needed, and data transfer can continue with the serving access point 703. If at least one transmission frequency used by the access point AP for data transfer with the mobile station MS (a conventional WLAN access point has only one operating frequency) is in a barred frequency range, then the serving access point is changed 704 to one that is not transmitting in a barred frequency range. In step 704, the selection mechanisms illustrated in association with step 602 can be utilized. The connection to the selected access point AP can be implemented by utilizing known implementations associated with changing WLAN access points.

Figure 8A:
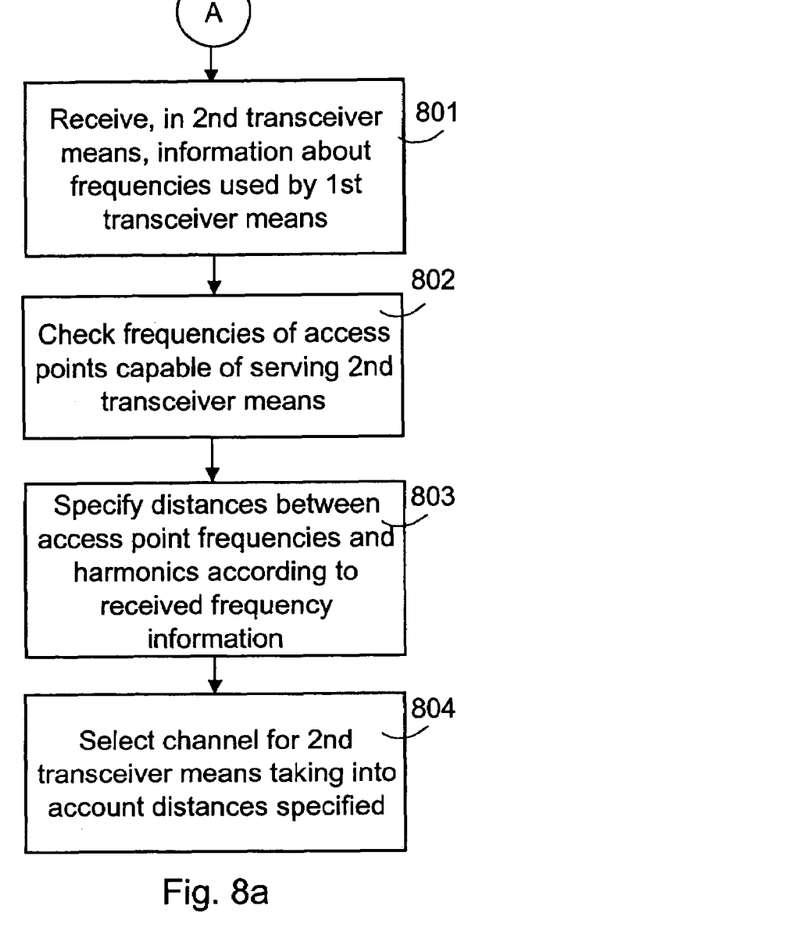
FIGS. 8a and 8b illustrate a method according to a preferred embodiment of the invention.
Figure 8B:
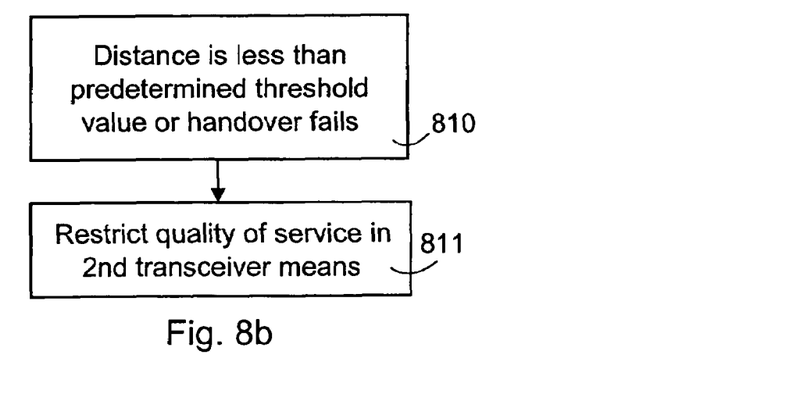

FIGS. 8a and 8b illustrate still another embodiment for avoiding the harmonics of the first transceiver means 212, 214 in the second transceiver means 222, 224. Information is received 801 from the first transceiver means 212, 214 about at least one transmission frequency used by them, and the information enables the determination of the harmonics frequencies. In step 802, the transmit frequencies of the access points AP capable of serving the second transceiver means 222, 224 are determined. These transmit frequencies of the access points are compared with the frequency of the harmonic of at least one transmission frequency used by the first transceiver means 212, 214, and the distances between the frequencies of the access points and the harmonic are determined 803. The channel to be used for the second transceiver means 222, 224 is selected 804 taking into account the determined distances.

In accordance with a preferred embodiment, the channel is selected 804 the distance of which is the largest to the harmonics caused by the first transceiver means 212, 214. Depending on where the algorithm illustrated in FIG. 8a is implemented, the access point AP to be used can thus be selected directly in step 804 or an access point AP can be suggested to the algorithm attending to access point AP management.

In accordance with a preferred embodiment of the invention, in the selection of the frequency to be used in the second transceiver means 222, 224, i.e. in the selection of the access point to be used in the WLAN system, the access points operating at the harmonic frequencies of the transmission frequency of the first transceiver means 212, 214 are imposed a penalty in the access point selection algorithm. In accordance with an embodiment, the access points operating at harmonic frequencies are left as the last alternatives on the list of available access points. In this case, the access points AP operating at harmonic frequencies can be selected for instance if the other access points are not suitable for use because of their other properties. If the access points are compared based on the reference values allocated thereto, this reference value may be lowered for the access points transmitting at frequencies of the harmonics.

This embodiment provides the advantage that an access point operating at harmonic frequencies can also be used in the second transceiver means if it is better by a preset threshold value than the next best access point (e.g. clearly better signal strength), should no other access points be available or should be quality of data transfer provided by the other access points be too poor.

When utilizing the embodiments of FIG. 8a, the different access points may be weighted based on their distances. In this case, the access points AP transmitting far away from harmonic frequencies can be preferred in view of those closer to the frequencies of the harmonics. This preference may be implemented for instance by using reference values proportional to the distance, the values being utilized in the access point selection algorithm.

In accordance with an embodiment illustrated in FIG. 8b, the quality of the service provided by the second transceiver means 222, 224 is restricted 811. Step 811 may be executed for instance if the distance of the reception frequency used in the second transceiver means 222, 224 to the harmonic remains below a predetermined distance threshold value or if handover (to a channel having a larger distance) fails in step 804. The threshold value is preferably set such that the channels exceeding it are not caused substantial interference by harmonics. If the distance exceeds the threshold value, there is no need to restrict the quality of service.

In accordance with a preferred embodiment, in step 811, the data rate used in the WLAN connection is restricted. If the access point AP is not changed, a reassociation request can be transmitted specifying the maximum rate supported by the MS. The access point AP then restricts the data rate used in accordance with the maximum rate.

Figure 9:
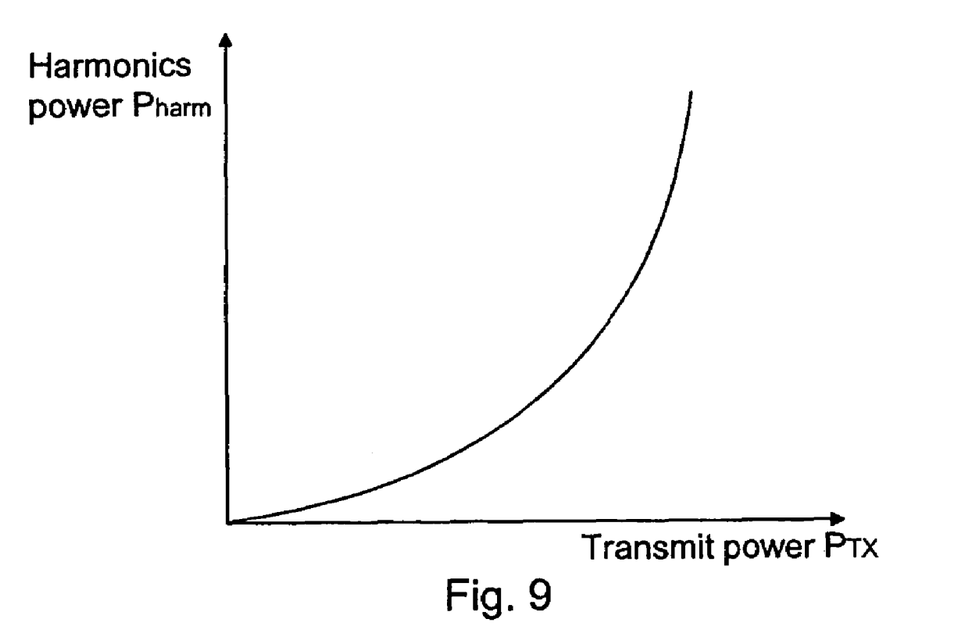
FIG. 9 illustrates the relationship of harmonics power to transmit power.
Figure 10:
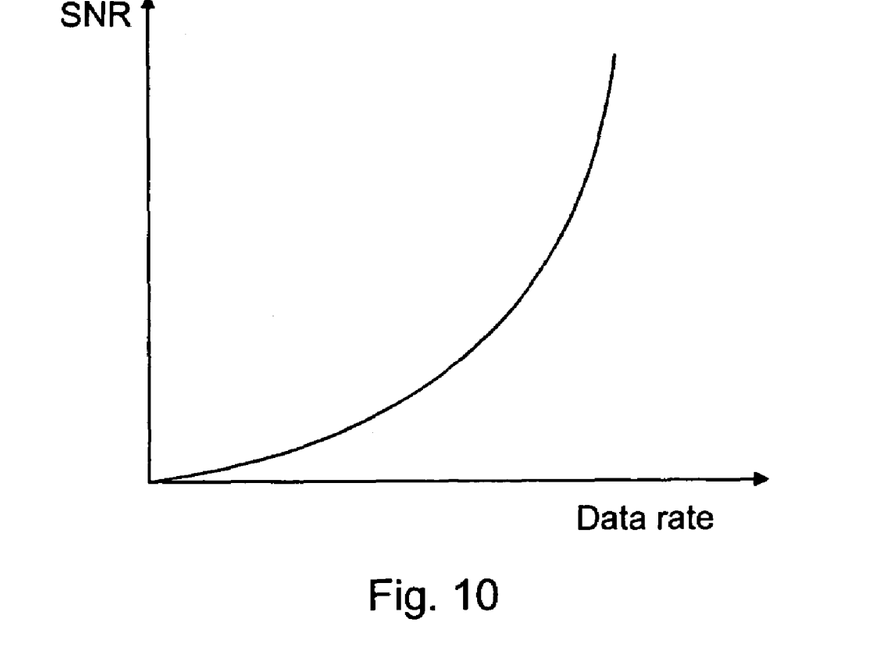
FIG. 10 illustrates the relationship of signal-to-noise ratio to data rate.

In accordance with an embodiment, the transmit power of the first transceiver means 212, 214 is taken into account in the second transceiver means 222, 224. Herein, information is also received from the first transceiver means 212, 214 about the transmit power $P_{TX}$ used in response to a request from the second transceiver means 222, 224 or in response to a change in transmit power. The effect (power level) of the harmonics in the second transceiver 222 can be determined from the transmit power $P_{TX}$, since the effect of the harmonics is a non-linear function of the transmit power $P_{TX}$ of the first transceiver 212, as is illustrated in FIG. 9. The power level $P_{harm}$ of the harmonics and the signal strength RSSI (received signal strength indicator) of the WLAN access point AP measured by the second transceiver 222 can be used to determine the signal-to-noise ratio SNR. The maximum data rate for the second transceiver 222 is a function of the signal-to-noise ratio SNR, as is illustrated in FIG. 10. In other words, the maximum operable data rate can be determined in the second transceiver means 222, 224 based on the received transmit power level of the first transceiver 212 and the signal strength RSSI of the access point AP. In accordance with an embodiment, the suggested rata rate can be derived from the condition:

$$SNR < RSSI - P_{harm},$$

the suggested data rate being determined from the signal-to-noise ratio SNR fulfilling the condition. The data rate used on the WLAN connection can thus be restricted in step 811 in the above manner based on the determined data rate. These functions expressing the change and illustrated in FIGS. 9 and 10 are predetermined in the mobile station MS. In accordance with an embodiment, the MS also comprises a calibration functionality for specifying the functions based on the settings and measurements of the first transceiver means 212, 214 and the second transceiver means 222, 224.

The above embodiment provides the advantage that the effect of harmonics on power consumption can be clearly reduced, since the signal-to-noise ratio increases non-linearly as the data rate increases.

In accordance with an alternative embodiment, the calculation of the harmonics of the transmit frequencies used and/or the barred frequency ranges is performed in the first transceiver means 212, 214 and information thereon is sent to the second transceiver means 222, 224. The second transceiver means 222, 224 utilize the received information when selecting the channel in the above-described manner.

Figure 11:
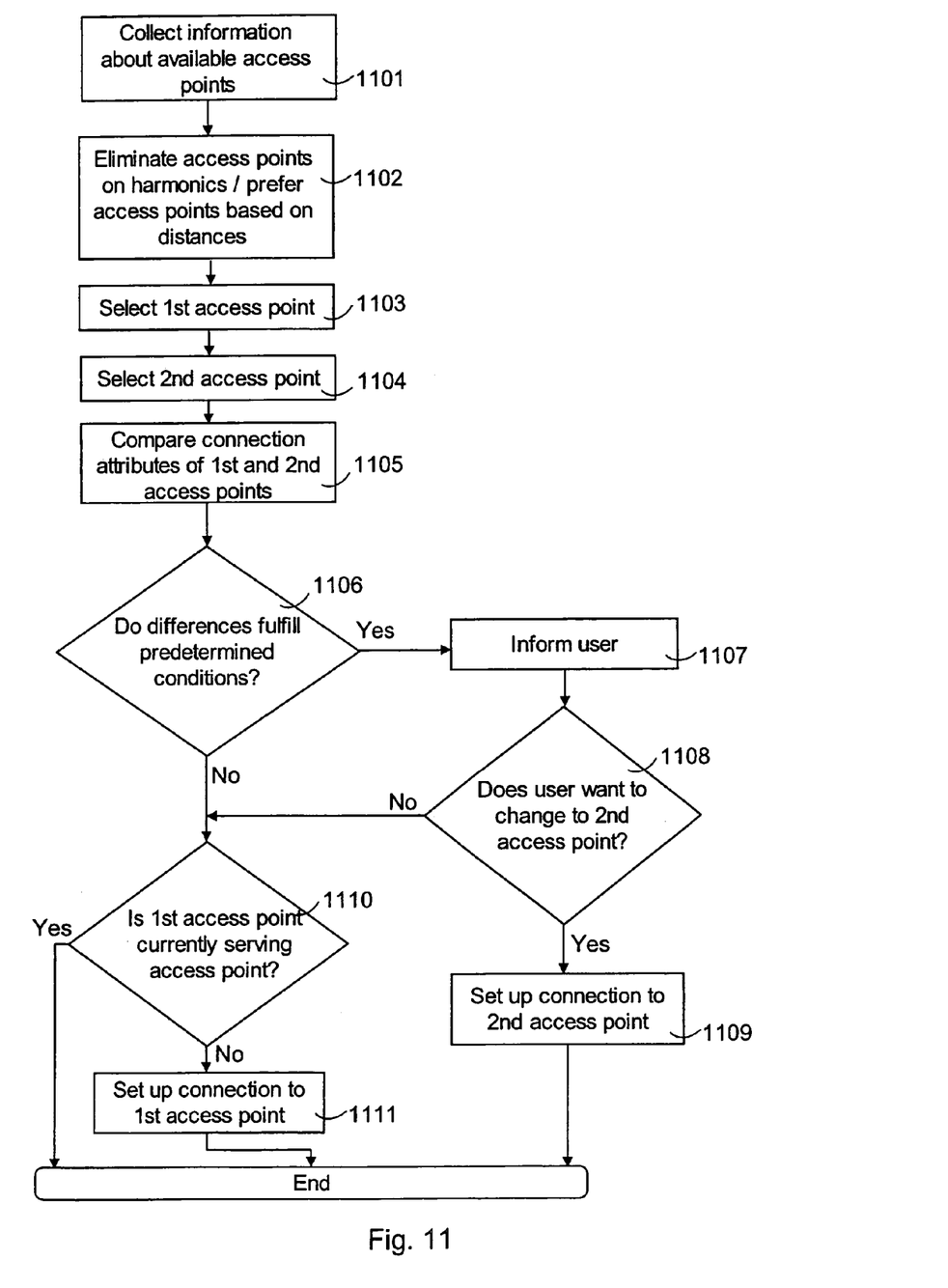
FIG. 11 shows a flow diagram illustrating a method according to a preferred embodiment of the invention for selecting the access point to be used.

FIG. 11 illustrates an access point selection algorithm wherein, in accordance with a preferred embodiment, one usable criterion is whether the access point AP transmits at frequencies of harmonics or not or how close to a harmonic the access point AP transmits (distance). The MS collects 1101 information about the available access points preferably periodically. The period is preferably adjustable and can be changed in accordance with the terminal MS. The access points AP typically transmit access point information periodically. Access point information includes at least the network name of the access point and other information on the access point AP. The other information may include for instance the load of the access point (i.e. how many terminals use the access point), information on the bandwidth used, information on supported data rates or security information. The mobile station MS may also transmit request to the access points AP and the available access points respond by transmitting access point information.

In step 1102, the mobile station MS may eliminate the access points AP transmitting at least partly on frequencies of at least one harmonic (of the transmissions of the transceiver 212) or, in accordance with another embodiment, prefer the access points AP based on the distances (in accordance with the embodiments illustrated in FIGS. 8a and 8b). The MS may check the network names of the available access points based on the collected data. The MS compares the connection attributes of the access points having the network name according to the currently serving access point, compares the connection attributes of the access points having a different network name than the currently serving access point, and selects the access points having the best connection attributes. The access points having the same network name belong to the same subnetwork. The connection attributes may be any attributes carrying information affecting the possible connections to access points. The MS selects 1103 a first access point having the best connection attributes from the available access points having the same network name as the currently serving access point. The MS also selects 1104 a second access point having the best connection attributes from the available access points having a different network name than the currently serving access point.

The same data as in the access point information can be used and the MS is able to compare the connection attributes of the different access points AP by comparing the data received from the different access point information. At least the signal level is preferably taken into account when comparing the available access points AP. Data from the access point information, such as access point load, supported data rates and security information may also be taken into account when comparing the access points. If the signal levels only are taken into account, the signal levels of the different access points are simply compared and the access point having the highest signal level is the access point having the best connection attributes. In accordance with a preferred embodiment, the distance to a harmonic is a connection attribute. If more than one connection attributes are taken into account, the different connection attributes may be weighted in different ways. There are many ways to implement access point comparison, and the connection attributes may be weighted in different ways for different users.

For example, the signal level is considered the most important connection attribute (weight 80%) and the distance to a harmonic is another connection attribute to be considered (weight 20%). Mathematical reference values can be determined for the available access points based on the weighting and the access points having the highest values are selected as the best access points. As was described above, the best access points are preferably selected separately among the access points having the same network name as the currently serving access point (the first access point 1103), and among access points having a different network name than the currently serving access point (the second access point 1104).

The MS compares 1105 one or more connection attributes of the first and second access points. A check is made 1106 to see if the differences between the connection attributes of the compared first and second access points fulfil predetermined conditions. The predetermined conditions may include conditions for the different connection attributes associated with the access point comparison. Preferably, at least a limit for the signal level difference is used, i.e. the signal levels of the first and second access points are compared and checked if the difference between the signal levels of the first and second access point exceeds the predetermined signal level limit. The use of the signal level often enables the selection of the access point closest to the terminal. Other conditions may also be used, for instance separately for each weighted attribute. An example is to use the distance to the harmonic also in this comparison. The predetermined conditions are preferably determined such that the connection remains in the access point having the same network name as long as possible in order to avoid changing subnetworks, which requires a change in the settings.

If the differences fulfil the predetermined conditions, in accordance with a preferred embodiment of the invention, the user is informed 1107 of this and a check is made 1108 to see if the user wants to change the connection to a second access point in another subnetwork. The connection to the second access point in the other subnetwork is set up 1109 only if the user allows the change. However, it is also possible to select the access point automatically, i.e. the connection to the second access point is set up (1109) if the differences exceed the predetermined conditions. The connection to the second access point is set up 1109 preferably only if the predetermined conditions are fulfilled.

In accordance with an embodiment, a check is made 1110 to see if the first access point is the currently serving access point, if the user does not want to set up a connection to the second access point or preferably at least one of the predetermined conditions cannot be fulfilled. If not, a connection 1111 can be set up to the first access point. If the first access point is the currently serving access point, no changes are needed. Collection of data, selection of a first and second access point and comparison of connection attributes are preferably performed periodically, i.e. each time on reception of access point information.

An alternative embodiment comprises calculating a quality factor for each channel (access point AP) suggested for the second transceiver means 222, 224. The quality factor can be the signal-to-noise ratio SIR, obtained in the previously illustrated manner from the ratio of the signal strength RSSI measured by the second transceiver means and the power $P_{harm}$ of the harmonic of the transmission frequency of the first transceiver means, i.e.

$$SIR=RSSI/P_{harm}.$$

If there are harmonics residing in the channel that are at a higher power level than thermal noise, the above formula is usable in the calculation of the quality factor for the channel/access point AP concerned. If there are no harmonics, the quality factor can be calculated by the generally known formula $$SNR=RSSI/P_{noise} \text{ (noise power)}.$$

The quality factor is usable when selecting a channel (access point AP) for the second transceiver means 222, 224. Herein, the aim is to select the channel having the best quality factor. The selection may also be implemented such that a channel whose frequency range shows a harmonic is selected if the access point AP is close and if the signal is sufficiently strong. The quality factor can be used as a connection attribute also in the access point selection algorithm illustrated in FIG. 11.

The embodiments illustrated above can be implemented in the control means 214 and 224, between which information transfer capabilities exist. The interface between the control means 214 and 224 can be implemented in many ways and it can be a unidirectional or a two-way communication bus. One of the control means 214 and 224 can serve as the host controlling the data transfer and the other as the client. It is to be noted that the control means 214 and 224 can be implemented in one control unit, whereby no separate interface is required.

In accordance with an embodiment, an interference reduction algorithm for minimizing interference caused at WLAN reception by taking into account harmonic frequencies is implemented in the control means 224 controlling the WLAN data transfer. The interference reduction algorithm receives, from the first control means 214, at least information about the transmission frequency used and performs, based on the available WLAN channels, at least part of the functions illustrated above in FIGS. 3, 4, 6, 7, 8a or 8b. The actual selection of the access point AP can be implemented in a separate access point selection algorithm, whereby the interference reduction algorithm can transmit information about the barred frequency range or suggest one or more suitable access points to the selection algorithm. For instance, in the embodiments of FIGS. 6 and 7, a change of access points is suggested, and only the access point selection algorithm selects (602, 704) the access point typically taking into account also other criteria, such as signal strength. When the embodiment illustrated in FIG. 8b is used, the interference reduction algorithm also takes into account the transmit power $P_{TX}$ and the signal strengths RSSI of the available channels, and suggests a restricted data rate.

In accordance with a preferred embodiment, the invention is applied to a mobile station MS functioning in the DCS frequency range and the IEEE802.11a frequency range. Uplink channels transmitted from a transceiver 212 according to the GSM standard include different traffic channels TCH and control channels RACH, SDCCH, SACCH of circuit-switched traffic. If the MS supports the GPRS service, the PDCH channel is used for packet-switched data traffic and signalling. More detailed descriptions of the different channels are found in the ETSI (European Telecommunications Standards Institute) GSM/GPRS specifications. DCS channels 512-885 use the frequency range 1710-1784 MHz, so the harmonics range caused by them is 5130-5454 MHz. If the intention is to keep a 20-MHz difference to the harmonics, the DCS channels 512-561 and 861-885 have no effect on the functioning of an IEEE802.11a receiver, since the IEEE802.11a frequency range is 5150-5350 MHz. If the assumption is that the transceiver 212 transmits in DCS channel 750 whose center frequency is 1757.8 MHz, the harmonic is located around the frequency 5273.4 MHz. The center frequency of the IEEE 802.11a channel 52 is 5260 MHz and the center frequency of channel 56 is 5280 MHz, so these channels are then to be avoided.

In accordance with a preferred embodiment, harmonics are determined and observed in accordance with the above description only for traffic channels, since it has been detected that the harmonics of signalling channels typically cause no significant interference. Herein, the processing caused by the determination and observation of the harmonics of the signalling channels (including RACH, SDCCH, SACCH) is avoided. Since frequency hopping is available in GSM/GPRS traffic, frequency hopping may also be taken into account when determining harmonics. The harmonics may be determined based on the hop set known by the first transceiver means 212, 214. This enables the determination of, instead of single hopping channels, for instance a frequency range (FIG. 3) barred based on the hop set and on which frequency hopping takes place. After this, the entire frequency hopping frequency range can be avoided in the second transceiver means 222, 224.

In accordance with still another embodiment, information is received from the first transceiver means 212, 214 also about the transfer mode or state, which is utilized in the second transceiver means 222, 224 in channel selection. The transfer mode may be for instance a circuit-switched call, a packet-switched connection or idle. For example, when GSM circuit-switched services are concerned, information is transferred regarding whether a traffic channel TCH is active via the first transceiver means 212, 214. If packet-switched services are concerned, it is possible to indicate if a PDP context is activated or if transmissions on a PDP context are frequent. In accordance with an embodiment, the functionality illustrated above for determining and observing harmonics can be used when the first transceiver means 212, 214 are used for active transmission in accordance with the transfer mode. This embodiment provides the advantage that the aim is to avoid harmonics only during active traffic, whereby the functionality does not consume the resources of the mobile station MS at other times. Alternatively, frequency information may be determined in the first transceiver means 212, 214 and sent to the second transceiver means 222, 224 based on the current transfer mode.

In the above, examples were presented wherein the harmonics of the frequencies used by the first transceiver means 212, 214 attending to the cellular connection (in the example presented, with the base transceiver station BTS of the GSM network) are avoided in the second transceiver means 222, 224 attending to the WLAN connection. In accordance with an alternative embodiment, frequencies causing harmonics in frequency ranges used by the WLAN connection are avoided in transceiver means attending to the cellular connection, such as in the means attending to the GSM connection. This embodiment can be implemented in many ways and the embodiments presented above in association with FIGS. 3 to 7 can be utilized. To the means attending to the GSM connection, information can be sent from the transceiver means attending to the WLAN connection about the frequency used for the WLAN connection, information about at least one frequency that should not be used for the GSM connection, or only information stating that at least one frequency used for the GSM connection should be changed. The means attending to the GSM connection can store the information about the frequencies to be avoided and take it into account when communicating with the base transceiver station BTS. The means attending to the GSM connection can change, as far as is possible, (constant frequencies may be in use that cannot be changed) the transmission frequency used by transmitting a handover request to the base transceiver station BTS or by reporting an inferior-quality signal to the base transceiver station BTS. The base transceiver station BTS can then change the frequency used.

It is apparent to a person skilled in the art that as technology advances, the basic inventive concept can be implemented in many ways. By utilizing the functions described above, the invention can be applied to any wireless terminal comprising at least two transceivers operating at different frequencies. Table 1 below shows systems whose harmonics ranges coincide with the frequency ranges used by the WLAN system. The invention is, however, applicable to other technologies than those presented in Table 1.

TABLE 1

| Technology | Frequency range | Harmonics range | WLAN frequency range |
|---|---|---|---|
| GSM850 US CDMA (IS-95) | 3 × (824-849 MHz) | 2472-2547 MHz | 2400-2483.5 MHz |
| EGSM900 | 6 × (880-915 MHz) | 5280-5490 MHz | 5150-5350 MHz 5470-5725 MHz |
| DCS1800 | 3 × (1710-1785 MHz) | 5130-5355 MHz | 5150-5350 MHz |
| PCS1900 | 3 × (1850-1910 MHz) | 5550-5730 MHz | 5470-5725 MHz |
| WCDMA FDD | 3 × (1920-1980 MHz) | 5760-5940 MHz | 5725-5825 MHz |

The invention and its embodiments are thus not limited to the above-described examples, but may vary within the scope of the claims.

The invention claimed is:

1. A method in a wireless terminal comprising:
receiving information about at least one traffic channel regarding transmission power and at least one transmission frequency of a first transceiver,
determining at least one harmonic of the at least one transmission frequency of the first transceiver for obtaining at least one barred frequency range, the barred frequency range comprising the determined at least one harmonic,
measuring signal strength transmitted by the first transceiver,
calculating a quality factor for the at least one traffic channel as a ratio of the measured signal strength and the information regarding the transmission power,
selecting at least one channel for use in a second transceiver by taking into account the at least one barred frequency range and the quality factor, and
determining for a transmission of a second transceiver a maximum data rate by using the information regarding the transmission power and the measured signal strength.

2. A method as claimed in claim 1, further comprising:
submitting an inquiry from the second transceiver to the first transceiver about transmission frequencies used,
sending information about at least one transmission frequency of the first transceiver to the second transceiver, and
determining harmonics in the second transceiver.

3. A method as claimed in claim 1, further comprising:
sending information about a transmission frequency of at least one channel from the first transceiver to the second transceiver in response to a change in at least one of the following: the transmission frequency and transmission power.

4. A method as claimed in claim 1, wherein a change of a transmission frequency used by the second transceiver is initiated in response to a harmonic of at least one transmission frequency of the first transceiver residing on a reception channel used by the second transceiver.

5. A method as claimed in claim 1, wherein at least one channel is selected for use in the second transceiver such that no harmonics of the transmission frequencies of the first transceiver exist in the frequency range of the at least one channel, further comprising:
  checking transmission frequencies of access points capable of communicating wirelessly with the second transceiver,
  selecting an access point at whose transmission frequency no harmonics of the first transceiver reside, and
  setting up a connection to the access point.

6. A method as claimed in claim 1, further comprising:
  determining distances between frequencies of the channels available to the second transceiver and the at least one harmonic of at least one transmission frequency of the first transceiver, and
  selecting a channel amongst the channels available to the second transceiver, distance of which is the largest to the at least one harmonic of the at least one transmission frequency of the first transceiver.

7. A wireless terminal comprising a first transceiver and a second transceiver, the wireless terminal being configured to:
  determine transmission power and at least one transmission frequency used in the first transceiver,
  determine at least one harmonic of the at least one transmission frequency and determine at least one barred frequency range, the barred frequency range comprising the at least one harmonic,
  measure signal strength transmitted by the first transceiver,
  calculate a quality factor for at least one traffic channel as a ratio of the measured signal strength and the determined transmission power,
  select at least one channel for the second transceiver by taking into account the at least one barred frequency range and the quality factor, and
  determine for a transmission of a second transceiver a maximum data rate by using the transmission power and the measured signal strength.

8. A wireless terminal as claimed in claim 7, further comprising a first transceiver controller and a second transceiver controller, the wireless terminal configured to submit an inquiry from the second transceiver controller to the first transceiver controller about the frequencies used, and wherein
  the first transceiver controller is configured to submit information about at least one transmission frequency of the first transceiver to the second transceiver controller, and
  the second transceiver controller is configured to determine the harmonics on the basis of the information from the first transceiver controller.

9. A wireless terminal as claimed in claim 7, wherein the wireless terminal further comprises a first transceiver controller and a second transceiver controller, the first transceiver controller configured to submit information about the transmission frequency of at least one channel to the second transceiver controller in response to a change in at least one of the following: the transmission frequency transmission power.

10. A wireless terminal as claimed in claim 7, configured to initiate a change of a channel used by the second transceiver in response to a harmonic of at least one transmission frequency of the first transceiver residing on a reception channel used by the second transceiver.

11. A wireless terminal as claimed in claim 7, configured to select at least one channel for use in the second transceiver such that no harmonics of the transmission frequencies of the first transceiver exist in the frequency range of the at least one channel,
  configured to check transmission frequencies of access points capable of communicating wirelessly with the second transceiver,
  configured to select an access point at whose transmission frequency no harmonics of the first transceiver reside, and
  configured to set up a connection to the access point.

12. A wireless terminal as claimed in claim 7, configured to:
  determine distances between frequencies of the channels available to the second transceiver and harmonics of at least one transmission frequency of the first transceiver, and
  channels available to the second transceiver based on the determined distances.

13. An apparatus comprising:
  at least one processor; and
  a memory storing a computer program code, the memory and computer program code configured to, with the at least one processor, cause the apparatus at least to:
  determine transmission power and at least one transmission frequency used in a first transceiver,
  specify at least one harmonic of at least one transmission frequency used in a first transceiver on the basis of the at least one transmission frequency of the first transceiver for obtaining at least one barred frequency range, the barred frequency range comprising the specified at least one harmonic,
  measure signal strength transmitted by the first transceiver,
  calculate a quality factor for at least one traffic channel by using a ratio of the measured signal strength and the transmission power,
  select at least one channel for a second transceiver by taking into account the at least one barred frequency range and the quality factor, and
  determine for a transmission of a second transceiver a maximum data rate by using the transmission power and the measured signal strength.

14. An apparatus as claimed in claim 13, further configured to submit an inquiry to a transceiver controller about frequencies used.

15. An apparatus as claimed in claim 13, further configured to receive information about a change of a transmission frequency of at least one channel.

16. An apparatus as claimed in claim 13, further configured to initiate a change of a channel used by the second transceiver in response to a harmonic of at least one transmission frequency of the first transceiver residing on a reception channel used by the second transceiver.

17. An apparatus as claimed in claim 13, further configured to select at least one channel for use in the second transceiver such that no harmonics of the transmission frequencies of the first transceiver exist in a frequency range of the channel.

18. An apparatus as claimed in claim 13, further configured to:
  check transmission frequencies of access points capable of communicating wirelessly with the second transceiver,
  select an access point at whose transmission frequency no harmonics of the first transceiver reside, and
  control set-up of a connection to the access point.

19. An apparatus as claimed in claim 13, further configured to:
  determine distances between frequencies of the channels available to the second transceiver and harmonics of at least one transmission frequency of the first transceiver, and determine channels available to the second transceiver based on the determined distances.

20. An apparatus as claimed in claim 13, comprising a transceiver for cellular mobile communications as the first transceiver and another transceiver for wireless local area network communications as the second transceiver.

* * * * *